United States Patent
Franz

(10) Patent No.: US 10,175,141 B2
(45) Date of Patent: Jan. 8, 2019

(54) SYSTEM FOR DETERMINING THE POSITION OF A TEST OBJECT

(71) Applicant: Trioptics GmbH, Wedel (DE)

(72) Inventor: Stefan Franz, Jena (DE)

(73) Assignee: Trioptics GmbH, Wedel (DE)

( * ) Notice: Subject to any disclaimer, the term of this patent is extended or adjusted under 35 U.S.C. 154(b) by 349 days.

(21) Appl. No.: 14/806,077

(22) Filed: Jul. 22, 2015

(65) Prior Publication Data
US 2015/0323417 A1    Nov. 12, 2015

Related U.S. Application Data

(63) Continuation of application No. PCT/EP2014/000148, filed on Jan. 21, 2014.

(30) Foreign Application Priority Data

Jan. 23, 2013    (DE) .......... 10 2013 001 458

(51) Int. Cl.
*G01B 11/02*    (2006.01)
*G01M 11/08*    (2006.01)
(Continued)

(52) U.S. Cl.
CPC .......... *G01M 11/08* (2013.01); *G01B 11/00* (2013.01); *G01B 11/26* (2013.01);
(Continued)

(58) Field of Classification Search
CPC .... G02B 15/14; G02B 27/62; G02B 17/0694; G02B 17/0896; G01B 11/026; G01B 11/002; G01B 11/30; G01M 11/081
See application file for complete search history.

(56) References Cited

U.S. PATENT DOCUMENTS

| | | | | |
|---|---|---|---|---|
| 4,585,349 A | * | 4/1986 | Gross | G01B 11/00 356/624 |
| 5,513,000 A | * | 4/1996 | Smith | F41G 3/323 356/139.03 |

(Continued)

FOREIGN PATENT DOCUMENTS

| CN | 1510393 | 7/2004 |
|---|---|---|
| CN | 101231158 | 7/2008 |

(Continued)

OTHER PUBLICATIONS

"What is autocollimation", http://conradhoffman.com/ac01.htm, Nov. 11, 2010.*
(Continued)

*Primary Examiner* — Tri Ton
*Assistant Examiner* — Rebecca C Bryant
(74) *Attorney, Agent, or Firm* — Lempia Summerfield Katz LLC

(57) ABSTRACT

The invention relates to a system for determining the position of a test object comprising the following features: an autocollimation telescope having a beam source for emitting a beam; a beam splitter; a detector unit and an objective lens; and an optical element embodied as a focusing device, wherein the test object, the beam source and the focusing device are arranged along a common optical axis (z), and a control device for controlling the focusing device, which is designed in such a way that the beam can be focused onto a center of curvature of a first test surface of the test object with the coordinates (x1, y1) and at least onto a center of curvature of a second test surface of the test object with coordinates (x2, y2).

5 Claims, 2 Drawing Sheets

(51) Int. Cl.
*G01B 11/26* (2006.01)
*G01M 11/02* (2006.01)
*G01B 11/00* (2006.01)
*G02B 27/30* (2006.01)
*G02B 27/32* (2006.01)
*G02B 27/62* (2006.01)

(52) U.S. Cl.
CPC ......... *G01M 11/0221* (2013.01); *G02B 27/30* (2013.01); *G02B 27/32* (2013.01); *G02B 27/62* (2013.01)

(56) References Cited

U.S. PATENT DOCUMENTS

| | | | |
|---|---|---|---|
| 7,307,708 | B2 | 12/2007 | Murata |
| 8,913,234 | B2 | 12/2014 | Heinisch et al. |
| 2005/0128468 | A1 | 6/2005 | Murata |
| 2005/0200973 | A1* | 9/2005 | Kogo ............... G02B 3/14 359/689 |
| 2006/0164630 | A1* | 7/2006 | Hofbauer ............ G01B 11/26 356/141.1 |
| 2011/0075887 | A1 | 3/2011 | Tanaka |
| 2012/0133924 | A1 | 5/2012 | Heinisch et al. |

FOREIGN PATENT DOCUMENTS

| | | |
|---|---|---|
| CN | 102032982 | 4/2011 |
| DE | 102005013755 | 9/2006 |
| DE | 102006049426 | 5/2007 |
| DE | 102010053422 | 3/2012 |
| EP | 2458363 | 5/2012 |
| GB | 1305925 | 2/1973 |
| JP | 2005164267 | 6/2005 |
| JP | 2006343596 | 12/2006 |
| JP | 2008009187 | 1/2008 |
| JP | 201060382 | 3/2010 |
| JP | 2012118066 | 6/2012 |

OTHER PUBLICATIONS

International Search Report cited in PCT/EP2014/000148, dated Mar. 13, 2014.

Translation of Office Action, English translation of office action in corresponding Japanese Patent Application No. 2015554085, Office Action dated Nov. 21, 2017; 4 pages.

Translation of Office Action, English translation of first office action in corresponding Chinese Patent Application No. 2014800057135, Office Action dated Jun. 23, 2017; 3 pages.

Translation of Office Action, English translation of first office action in corresponding Chinese Patent Application No. 2014800057135, 3 pages.

JP Office Action 07062018, Japanese Office Action cited in corresponding Japanese Application No. 2015-554085 with an English translation; dated Jul. 6, 2018; 7 pages.

\* cited by examiner

SYSTEM FOR DETERMINING THE POSITION OF A TEST OBJECT

CROSS-REFERENCE TO RELATED APPLICATIONS

This is a continuation application of International Patent Application PCT/EP2014/000148, which was filed on Jan. 21, 2014 and claims benefit of German patent application 102013001458.1 filed on Jan. 23, 2013. The full disclosure of these earlier applications is incorporated herein by reference.

BACKGROUND OF THE INVENTION

1. Field of the Invention

The present invention relates to a system for determining the position of a test object, and in particular for determining the position of the centers of curvatures of a lens system.

2. Description of Related Art

Known from the prior art are focussing devices and autocollimation telescopes for measuring changes in location and angle and centering errors of lenses and lens systems, in which a beam splitter and an objective lens, which acts as a collimator and telescope, are used to evaluate a suitable projected image following reflection at the surface to be examined. Known evaluation units are, for example, two-dimensional sensor units or, in the classic case, the human eye. If the centre of curvature of the examined surface (sphere) is not exactly on the reference axis, the illumination beams do not impinge perpendicularly upon the surface of the testpiece. As a result, following reflection at the surface of the testpiece, they do not return into themselves, but are reflected at a reflection angle that deviates from 90° to the surface. The deviation is directly proportional to the centering error of the examined surface (sphere).

In this case, in order to describe the position of a lens or cemented element, or a group of elements, it is necessary for two surfaces to be measured. If this is to be related to further surfaces, these further surfaces must also be measured. This object equates to the object of imaging the image of a mark on to any given location along an optical axis. To achieve this object, it is known from the prior art to use exchangeable supplementary optical systems, or to change the imaging distance of the autocollimation telescope by means of an internal focussing system (e.g. by means of lenses or lens groups that are displaceable along the optical axis), or to achieve, by changing the distance (linear guide) between the autocollimation telescope and the surface to be examined (testpiece or test object), that the image from the reflection of the surface of a mark from the autocollimation telescope that is to be examined appears again in the plane of the mark, such that it can be received by a detection unit.

SUMMARY OF THE INVENTION

It is an object of the present invention to provide an improved system, which, in particular, does not require linear guides and interchangeable optical systems, and which, moreover, can provide more rapid measuring of the surface of a test object, in order, for example, to deduce any centering errors therefrom. This object is achieved by a system for determining the position of a test according to the attached claims.

In an embodiment of the invention, a system for determining the position of a test object has the following features: an autocollimation telescope, having a beam source for emitting a beam; a beam splitter; a detector unit and an objective lens; and an optical element embodied as a focussing device, the test object, the beam source and the focussing device being arranged along a common optical axis (z), and a control device for controlling the focussing device, which is designed in such a way that the beam can be focussed onto a centre of curvature of a first test surface of the test object having the coordinates (x1, y1) and at least onto a centre of curvature of a second test surface of the test object having the coordinates (x2, y2).

The test surface may be spherical in form. However, the above considerations also apply to the particular cases "plane surface" and "asphere". In the particular case of the plane surface, the equivalent of the centre of curvature exists as a direction of the normals of the plane surface, likewise having the coordinates x1 and y1. In the second particular case, the aspheric surface is to be approximated locally as a spherical surface. With this local consideration, there again exists a local centre of curvature that, for the present consideration, is treated like the centre of curvature of a regular sphere.

There thus exists a centre of curvature, which is located at a distance in front of or behind the test surface. This point becomes effective for the real or notional imaging of a mark or measuring structure. The test surface is thus described by its parameters "position of the centre of curvature" and "radius of the sphere". In the following, the term "test surface" is also used as a synonym for its significant parameters.

The focussing of the focussing device onto at least two test surfaces in rapid time succession enables the position, or a change in the position, of the two test surfaces to be determined "quasi-simultaneously". Overall, therefore, it is possible to determine the position of the test object. In an embodiment of the invention it is possible to dispense with additional optical systems or linear guides. The adjustment of test objects, for example optical components, can therefore not only be effected more rapidly, but can also be improved qualitatively. Furthermore, the necessary components are preferably rotationally symmetrical and small. As a further advantage, this results in a limited structural space.

The possibility of reducing the size of the system and dispensing with rotation enables the centering method to be applied even if the test object cannot be mounted on a revolving stage, e.g. because of its size, or because of beam convolutions that limit the accessibility for external viewing into the autocollimation telescope.

Thus, unlike the prior art, the control device for controlling the focussing device is not used to displace the focussing device as such. In contrast thereto, the control device is used to alter the optical property, in particular the refractive power, of the focussing device, such that it is possible to focus on differing centres of curvature of surfaces to be tested.

A test object is understood to mean a single test object, or an aggregate test object composed of a plurality of partial test objects. For example, in the second case, this may be an achromatic lens, composed of two, three or a multiplicity of lens elements that are cemented together over their surface or joined together by means of mounts.

In a preferred embodiment, the autocollimation telescope additionally comprises a measuring structure. Thus, by means of the measuring structure, an image that can be evaluated can be imaged onto the detector unit. In this context any component for measuring electromagnetic radiation (e.g. a CCD sensor or a camera) may be understood as a detector unit.

If the test object is a single lens, this means as follows: From the position of the two images, which are seen quasi-simultaneously or, in the case of two light colours being used for illumination, actually simultaneously, on the camera, the position of the lens centre and the tilt of the lens axis can calculated equally rapidly, and made available as a measuring or control signal.

In a further preferred embodiment, the control unit comprises a computer unit and/or a display unit. It is thus possible, by means of one unit, both to control the focussing device and, from the measurement values obtained, to deduce the position of the test object by means of the computer unit, and to display the position of the test object in a display unit.

In a further preferred embodiment, the focussing device is embodied as a lens having a settable refractive power, in particular as a variable electrical lens. The refractive power of such lenses can be varied very rapidly by a corresponding control device.

In this embodiment, the focussing device differs from the known prior art in that it does not require any mechanical movement of lenses or lens systems. The preferred use of optical elements having a focal length that can be varied directly by electrical means makes it possible to achieve a short switchover time between the individual focussing states.

The appliance is thus of a more simple construction than those known hitherto, its operation is faster, owing to the absence or reduction of non-productive times, and it becomes possible to use other algorithms for an adjustment sequence, which enable the adjustment period to be reduced further, in that fewer iteration cycles are required.

If the test object is located on the common optical axis, the real or virtual images are produced directly in the centres of curvature of the test surfaces. As long as the test object is not yet aligned, the beams from the autocollimation telescope do not impinge perpendicularly upon the test surface. The real or virtual image is then produced at the same distance, but laterally offset, in relation to the optical axis of the autocollimation telescope. This lateral offset, which is denoted by d1 and d2 for two test surfaces, is observed on the detector unit by the autocollimation telescope, and is thus available as measurement information. This information can be evaluated for test purposes or, by means of this information, the test surfaces can be influenced appropriately, i.e. displaced or tilted, such that the test surface comes to lie with its centre of curvature on the common optical axis. The ideal case that is represented in the figures shown later can thus be achieved. In this way, the tolerances of the position of the test surfaces can be minimized. From the defective coordinates (x1, y1, z1), in which the position of the foci or the position of the centre of curvature can be specified, there thus ensue the coordinates (0, 0, z1), which then correspond for the foci and the centre of curvature.

This transformation describes an essential application of the invention. However, the possibility of quasi-parallel representation of the position of centres of curvature at differing distances opens up new possibilities for adjustment. The changing of the position of a surface changes the apparent position, i.e. the position seen by the autocollimation telescope, of the centre of curvature seen behind it. For conventional mounting, it is therefore advantageous to commence with mounting from the side of the autocollimation telescope. For the analysis of the surfaces at a greater distance from the autocollimation telescope, it is always necessary to effect new measurement of all surfaces. The duration of measurement is then prolonged, not only by the changing of the focal distance, but also, in particular, by the need to completely measure all surfaces, or to recalculate the adjustment target.

It is not only the measuring or mounting sequence that is speeded up by the quasi-simultaneous representation of the position of differing centres of curvature. It is possible to use other sequences appropriately, and thereby achieve a further simplification of the sequence. The effect of a change upon the apparent position of the centres of curvature is "seen" virtually simultaneously. It is not absolutely necessary to calculate the position of surfaces. For example, it is possible to use a simple algorithm, the aim of which is "to approximate all image measuring structures to each other". This does not require an exact calculation concerning the knowledge of the structure of the test object.

In a further preferred embodiment, there is is a further, supplementary lens provided along the optical axis (z), which is arranged between the objective lens and the focussing device. In particular, this supplementary lens is used if the minimum refractive power of the focussing device differs from 0. The supplementary lens can thus be used to preset a focussing range. Preferably, in a further embodiment, the supplementary lens is arranged so as to be displaceable along the optical axis (z).

Alternatively, it is also conceivable that there be at least two supplementary lenses arranged in an exchange unit, and that the first or the second supplementary lens be used, depending on the particular application, the first and the second supplementary lens differing in their refractive power.

In a further preferred embodiment, the test object is arranged on a revolving stage, the revolving stage being mounted so as to be rotatable about the optical axis (z). If the test object is perfectly aligned in relation to a reference axis, e.g. the optical axis (z), the individual light rays of the beam always impinge at the same angle upon the surface of the test object. This means that, even in the case of the test object being rotated about the reference axis, the image appears at the same place on the detector unit, for example a CCD sensor.

In a further preferred embodiment, the focussing device and the autocollimation telescope are realized as one structural unit. Additional structural space can thus be saved.

In a further preferred embodiment, the beam source has a first light-emitting diode, which emits light having a first colour, and a second light-emitting diode, which emits light having a second colour that is different from the first colour. The use of further light-emitting diodes having further colours may be advantageous, preferably for measuring a plurality of test objects having a plurality of boundary surfaces.

Preferably, the focussing of the beam onto the first and the second test surface is effected at video speed with a frequency in a range of between 1 and 50 Hz, preferably in a range of between 20 and 30 Hz, particularly preferably at 25 Hz. This rapid switchover of the focussing device, controlled by the control device, enables the position of the test object to be displayed subsequently by the display unit virtually in "real time".

If multicoloured light sources are used, the position of a plurality of test surfaces can be achieved with actual simultaneity, by means of an adapted switching regime. Using the example of a single lens having two test surfaces, this regime is described thus: With the start of the exposure time of a video image, firstly one of the illumination colours, e.g. green, is switched on, and the focussing is set to one of the test surfaces. After half of the exposure time, the illumination is set to the second light colour, e.g. red, and at the same time the focussing is set for the second test surface. When the camera image from a colour camera is read-out, there are thus two differing measurement images available, in the two colour channels, which images can be evaluated in parallel. One video image is thus sufficient for complete position measurement of a lens. For a plurality of test surfaces, the procedure is adapted accordingly.

Further, the invention also relates to a method for determining the position of a test object by means of a system, having the following features: providing a test object; focussing a beam, by means of the focussing device, onto a centre of curvature of a first test surface; generating a first measurement value; focussing the beam, by means of the focussing device, onto a centre of curvature of a second test surface; generating a second measurement value; evaluating the first and the second measurement value by means of the computer unit.

In a preferred embodiment the first test surface is exposed by means of the first light-emitting diode, and the second test surface is exposed by means of the second light-emitting diode. It is preferably provided in this case that the focussing of the beam, by means of the focussing device, onto the first test surface and the second test surface and a switchover from the first to the second light-emitting diode are effected synchronously. This has the effect that the image of the measuring structure is imaged with differing colours on the detector unit, and thus overall the display is also improved ergonomically.

The steps of generating a first and a second measurement value may comprise the following features: recording a first image by means of the detector unit, the image corresponding to a reflection of the measuring structure at the first test surface (x1, y1); recording a second image by means of the detector unit, the image corresponding to a reflection of the measuring structure at the second test surface (x2, y2).

The step of evaluating additionally may comprise the following features: deducing a position of the test object (xL, yL), by means of the computer unit, on the basis of the distances (d1, d2) determined and measured by the detector unit. In this case, such deduction of the position of the test object from the determined distances (d1, d2), or deviations, are known to persons skilled in the art.

Finally, the step of adjusting the test object is effected, which converts the centres of curvature having the coordinates (x1, y1) and (x2, y2) to the centres of curvature on the z axis.

In a particularly preferred embodiment, and in particular in the case of a test object consisting of a plurality of partial test objects arranged in series, the following supplementary method is employed. In a first method step, the centering error of the first test surface (x1, y1) is determined. In a succeeding, second method step, the centering error of a second test surface behind it is determined, with the centering error of the first test surface being taken into account. The calculation additionally includes, in particular, that, if it is necessary to focus on an inner, second test surface, the refraction at the preceding surfaces must be taken into account.

Additional further embodiments are provided by the respective dependent claims. It is understood that the embodiments that have just been described may be represented either singly or in combination with each other.

BRIEF DESCRIPTION OF THE DRAWINGS

Advantageous embodiments of the present invention are described in greater detail in the following with reference to the appended drawings in which.

DESCRIPTION OF PREFERRED EMBODIMENTS

Figure 1:
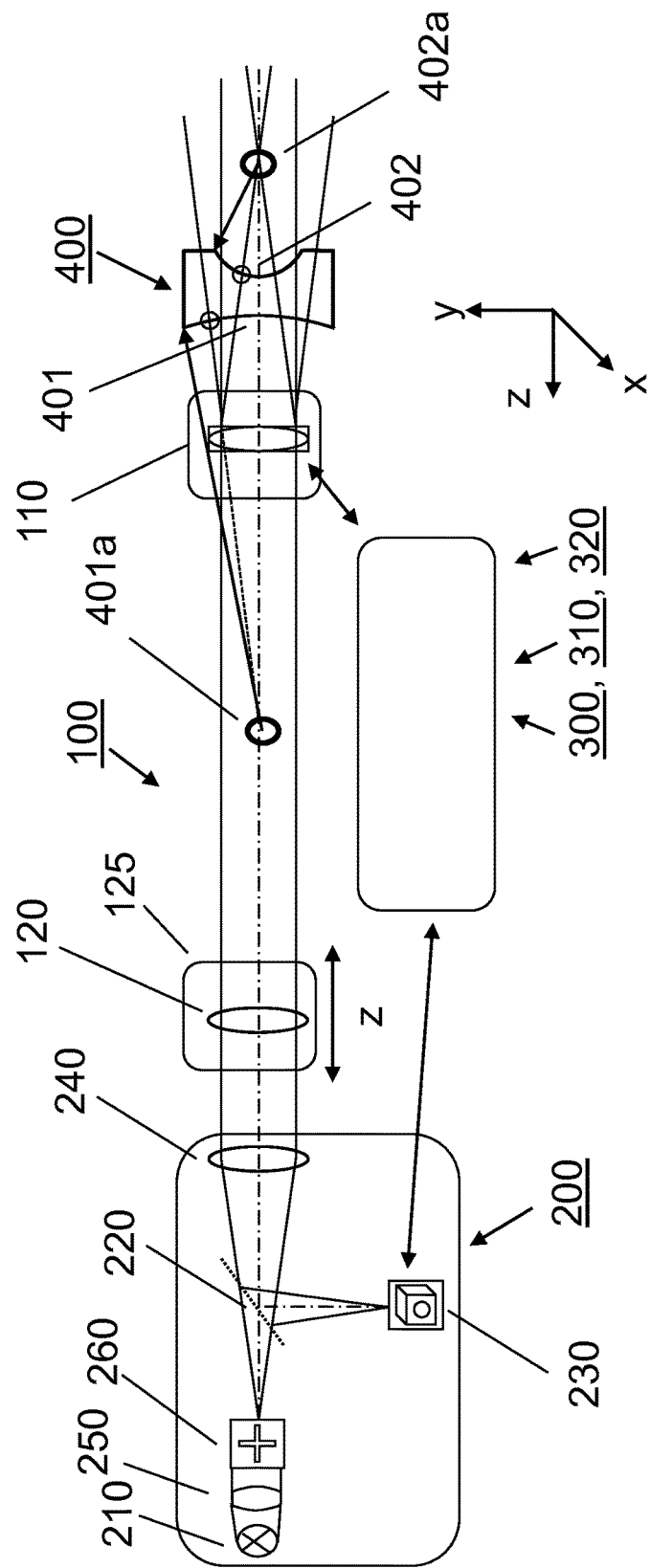
FIG. 1 shows a schematic structure of a system according to an embodiment of the invention for determining the position of a test object.

FIG. 1 shows a system 100 for determining the position of a test object 400. This system comprises at least one conventional autocollimation telescope 200, such as those long known from the prior art. Such an autocollimation telescope 200 has at least one beam source 210, a beam splitter 220, a detector unit 230 and an objective lens 240.

The objective lens 240 in this case acts both as a collimator objective lens and as a telescope objective lens. Arranged within the focal length of the objective lens 240 there is a beam splitter. The latter splits the beam path into a collimator beam path and a telescope beam path, having a collimator focal plane and, conjugate with the latter, a telescope focal plane. Arranged in the collimator focal plane there is a plate having a measuring structure 260, which is illuminated homogeneously by the illumination beam of a light source 210, via a condenser 250. The measuring structure is projected, via an objective lens, into infinity, reflected at a test surface of a test object 400 arranged in front of the autocollimation telescope, and imaged back into the telescope plane through the objective lens 240.

If the test surface has not been tilted relative to the optical axis of the autocollimation telescope, i.e. if its surface normal extends in the axial direction, the measuring structure 260 is imaged, more or less into itself, onto a detector unit 230. The image of the measuring structure 260 formed on the detector unit 230 drifts in dependence on the tilt angle alpha. According to the invention, the change in the position of the measuring structure is designated as a distance d.

A core element of the invention is then a focussing device 110, which, as shown clearly by FIG. 1, is arranged in front of the autocollimation telescope. The focussing device 110, the test object 400 and the beam source in this case are arranged along a common optical axis (z). This axis is normal to an x-y plane.

The focussing device 110 has an electrical lens 110, embodied as an optical element. This lens thus has a variable refractive power. Through this lens, by means of a control unit, it is then possible to focus the beam onto a centre of curvature of a first test surface 401 having the coordinates (x1, y1), and subsequently onto a centre of curvature of a second test surface 402 having the coordinates (x2, y2), of a test object 400. It must be pointed out that FIG. 1 shows the test object already in the adjusted state. The position of the two centres of curvature 401a and 402a is thus on the z axis. The position of the original centres of curvature, having the coordinates (x1, y1) and (x2, y2), is not represented in FIG. 1 and FIG. 2 for reasons of clarity.

Rapid switchover between the two test surfaces can be effected by means of the control unit 300. Such a switchover between the two test surfaces is effected at video speed with a frequency of 25 Hz. It is thus possible, by means of such a system, to measure the position of the two centres of curvature of the respective test surfaces 401 and 402 quasi-simultaneously, and to determine the position of the test object 400 from the measurement values. The position is determined by a computer unit 300, which evaluates the measurement values of the centres of curvature of the first and second test surfaces, and deduces a position of the test object 400 therefrom. The current position of the test object may be displayed, for example, via a monitor embodied as a display unit. On the basis of this information, the test object can be displaced, or tilted, such that the test surfaces come to lie with their centres of curvature on the common optical axis, as shown in FIG. 1.

Since it is frequency the case that an electrical lens has a refractive power that differs only minimally from 0, a supplementary lens 120, which is arranged in an exchange unit 125, is additionally provided in the system 100. This supplementary lens can be used for "coarse" presetting of the beam onto the test object. According to the embodiment, the supplementary lens 120 is arranged so as to be displaceable along the optical axis, in order to cover an even greater focussing range.

Figure 2:
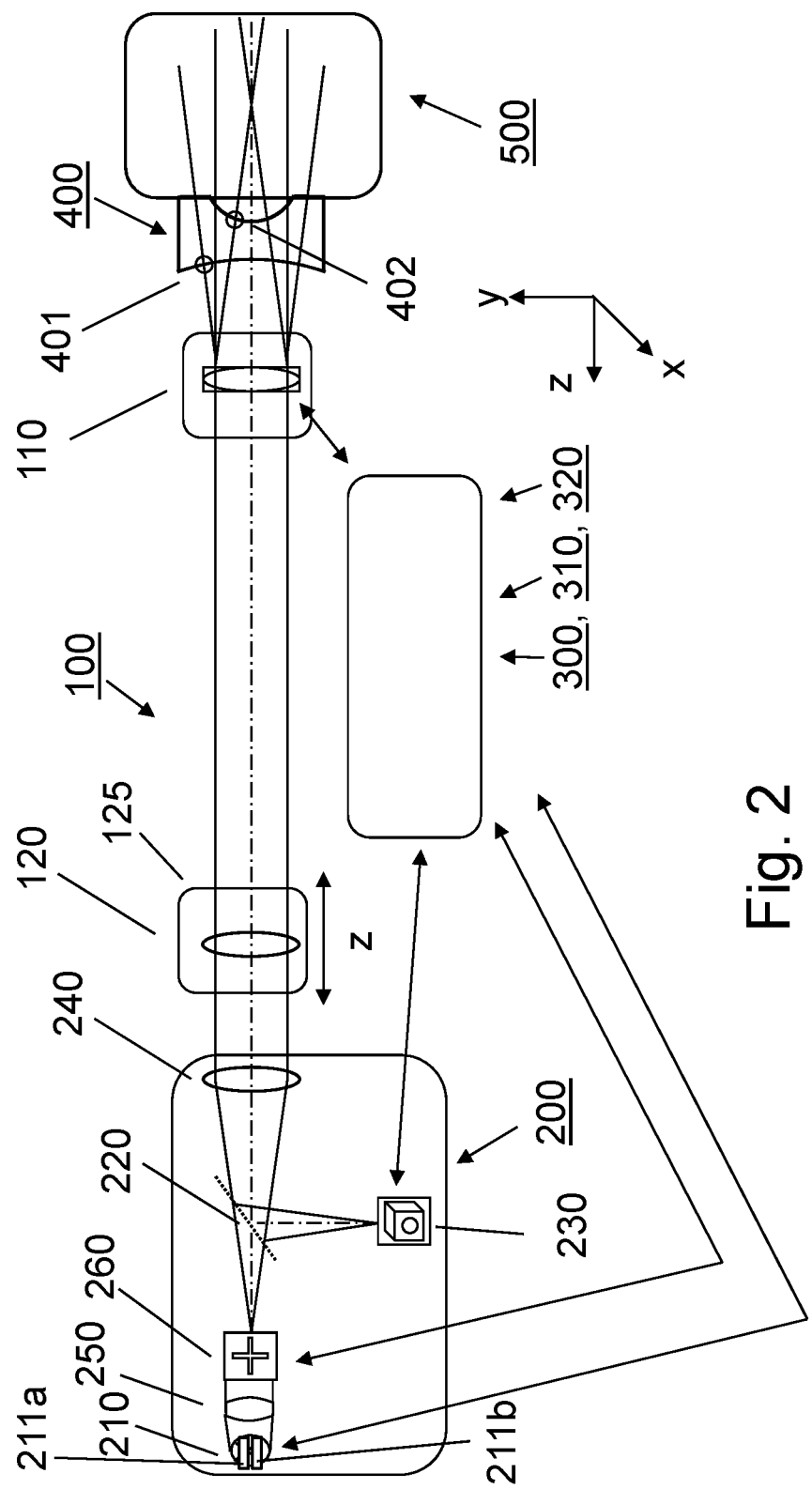
FIG. 2 shows a schematic structure of a further embodiment of a system according to the invention for determining the position of a test object.

The second embodiment according to FIG. 2 differs from the first embodiment in that, on the one hand, the test object is arranged on a revolving stage 500, which is mounted so as to be rotatable about the optical axis (z). It is thus possible, in the case of the test object being rotated about the optical axis, to generate a plurality of measurement values, and thus to reference the determination of position of the test object. If, for example, the test object is perfectly aligned in relation to a reference axis, e.g. the optical axis (z), the individual light rays of the beam always impinge at the same angle upon the surface of the test object. This means that, even in the case of the test object being rotated about the reference axis, the image appears at the same place on the detector unit 300. Moreover, the embodiment according to FIG. 2 also additionally differs from the first embodiment according to FIG. 1 in that the control unit also additionally controls the light source 210 and the measuring structure 260.

This is because, if switching is effected very rapidly back and forth between the two test surfaces, there may arise the problem that the images of the measuring structures reflected at the two test surfaces can no longer be distinguished. The problem is solved according to the invention in that the beam source 210 comprises a first light-emitting diode 211a, having a red colour, and a second light-emitting diode 211b, have a blue colour, which are switched synchronously. There is thus a colour distinction between the two measuring structures.

The visual improvement in the representation by means of switched light sources of differing colours operates in the case of a viewing eyepiece being used on the autocollimation telescope, or in the case of use of a colour camera or colour monitor as a display unit 300. The poor distinguishability of, for example, identical measuring structure close to the direct overlap is thereby overcome. However, this task may also be effected by means of a synthetic display on a computer monitor, as a display unit 300. In this case, a single-colour light source and a monochrome camera may be used as a detector unit 230. In this embodiment, the measuring structures 260 are distinguished by a software, by means of a computer unit 300, on the basis of their occurrence in time.

A further advantage in the case of direct evaluation by means of the computer unit 300 consists in that it is not only the position of (at least) two measuring structures 260, equivalent to the position of (at least) two centres of curvature of two test surfaces, that can be displayed. It is also possible, by means of the known calculation of the position of the test object, to output concomitantly at video speed the then known properties, "decentering" and "tilt" of the test object.

Alternatively, in a further embodiment, it is also additionally possible for the measuring structure 260 to have a different shape for the two test surfaces, and likewise to be switched over synchronously. The provision of the differing measuring structures is preferably effected by an image generator.

The invention claimed is:

1. A system for determining the position of a test object, comprising:
    an autocollimation telescope comprising a beam source that is configured to emit a light beam;
    a beam splitter;
    a detector unit;
    an objective lens;
    a focussing device, wherein the test object, the beam source and the focussing device are arranged along a common optical axis, and wherein the focussing device is formed by a lens having an adjustable refractive power, and
    a control device configured to control the focussing device so as to focus the light beam onto a centre of curvature of a first test surface of the test object having the coordinates (x1, y1), and onto a centre of curvature of a second test surface of the test object having the coordinates (x2, y2),
    wherein the beam source comprises a first light-emitting diode that is configured to emit light having a first colour, and a second light-emitting diode that is configured to emit light having a second colour that is different from the first colour, and
    wherein the control device is configured to control the focussing device, the first light-emitting diode and the second light-emitting diode so that a change from a focussing of the light beam onto the centre of curvature of the first test surface to a focussing of the light beam onto the centre of curvature of the second test surface is effected synchronously with a switchover from the first light-emitting diode to the second light-emitting diode.

2. The system of claim 1, wherein the autocollimation telescope comprises a measuring structure.

3. The system of claim 1, wherein the adjustable lens is an electrical lens.

4. The system of claim 1, comprising a first supplementary lens that is arranged along the optical axis between the objective lens and the focussing device.

5. The system of claim 4, wherein the first supplementary lens is arranged in an exchange unit that comprises at least one second supplementary lens, wherein the first and the at least one second supplementary lens have a different refractive power.

* * * * *